US012150564B2

(12) United States Patent
Ewing et al.

(10) Patent No.: US 12,150,564 B2
(45) **Date of Patent: *Nov. 26, 2024**

(54) ANTI-SWEEPING HOOK WITH INTEGRATED LOSS PREVENTION FUNCTIONALITY

(71) Applicant: Fasteners for Retail, Inc., Twinsburg, OH (US)

(72) Inventors: Brent O. Ewing, Roscoe, IL (US); Shane Obitts, North Ridgeville, OH (US); Chan Chor Man, Tai Po (HK)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,022

(22) Filed: Apr. 21, 2023

(65) Prior Publication Data

US 2023/0248160 A1 Aug. 10, 2023

Related U.S. Application Data

(63) Continuation of application No. 17/480,788, filed on Sep. 21, 2021, now Pat. No. 11,737,580, which is a (Continued)

(51) Int. Cl.
*A47F 1/12* (2006.01)
*A47F 5/08* (2006.01)
*G08B 13/22* (2006.01)

(52) U.S. Cl.
CPC ............ *A47F 1/128* (2013.01); *A47F 5/0876* (2013.01); *G08B 13/22* (2013.01)

(58) Field of Classification Search
CPC ........ G08B 13/22; A47F 1/128; A47F 5/0861; A47F 5/0876; E05B 73/0017; E05B 45/06
See application file for complete search history.

(56) References Cited

U.S. PATENT DOCUMENTS 1,922,989 A 8/1933 Terry
2,358,658 A 9/1944 Riche et al.
(Continued)

FOREIGN PATENT DOCUMENTS

CA 3054574 A1 8/2018
CN 102124178 A 7/2011
(Continued)

OTHER PUBLICATIONS

U.S. Appl. No. 18/305,022, filed Apr. 21, 2023, Ewing et al.
(Continued)

*Primary Examiner* — Brian Wilson
(74) *Attorney, Agent, or Firm* — Reinhart Boerner Van Deuren P.C.

(57) ABSTRACT

An anti-sweeping hook that includes a display hook for storing retail merchandise. The display hook has a first end and a second end opposite the first end. A helical coil is disposed about the display hook and extending along a lengthwise portion of the display hook. The helical coil has a first coil end proximate the first end of the display hook. Rotation of the helical coil in a first direction loads the retail merchandise onto the display hook. Rotation of the helical coil in a second direction opposite the first direction removes the retail merchandise from the display hook. A rotating handle is attached to the first end of the display hook and to the first coil end. The rotating handle is configured to determine an extent of rotation for the rotating handle.

7 Claims, 8 Drawing Sheets

Related U.S. Application Data continuation of application No. 16/588,573, filed on Sep. 30, 2019, now Pat. No. 11,154,143.

(56) References Cited

U.S. PATENT DOCUMENTS

| | | | |
|---|---|---|---|
| 2,398,411 | A | 4/1946 | Cook |
| 2,954,128 | A | 9/1960 | Gordon |
| 2,996,593 | A | 8/1961 | McMains |
| 3,248,005 | A | 4/1966 | Joschko |
| 3,550,121 | A | 12/1970 | Porter, Jr. |
| 3,572,546 | A | 3/1971 | Schlaf |
| 3,706,309 | A | 12/1972 | Toftness |
| 3,773,217 | A | 11/1973 | Schlaf |
| 3,848,745 | A | 11/1974 | Smith |
| 3,852,735 | A | 12/1974 | Matsuda et al. |
| 3,983,341 | A | 9/1976 | Stanish |
| 4,001,805 | A | 1/1977 | Golbe |
| 4,020,305 | A | 4/1977 | Schwartz |
| 4,021,796 | A | 5/1977 | Fawcett, Jr. et al. |
| 4,122,437 | A | 10/1978 | Petersen |
| 4,166,273 | A | 8/1979 | Riley, Jr. et al. |
| 4,227,188 | A | 10/1980 | Petersen |
| 4,269,025 | A | 5/1981 | Kondo |
| 4,289,242 | A | 9/1981 | Kenyon |
| 4,311,889 | A | 1/1982 | Blanchard et al. |
| 4,312,460 | A | 1/1982 | Boettcher |
| 4,352,170 | A | 9/1982 | Jetter |
| 4,352,171 | A | 9/1982 | Jetter |
| 4,370,069 | A | 1/1983 | Nomura |
| 4,383,242 | A | 5/1983 | Sassover et al. |
| 4,384,906 | A | 5/1983 | Molinari et al. |
| 4,462,023 | A | 7/1984 | Nielsen et al. |
| 4,470,236 | A | 9/1984 | MacDonald, Jr. |
| 4,475,658 | A | 10/1984 | Roberts |
| 4,566,598 | A | 1/1986 | Fors |
| 4,600,119 | A | 7/1986 | Olson |
| 4,638,922 | A | 1/1987 | Stoltz |
| 4,675,654 | A | 6/1987 | Copeland |
| 4,706,821 | A | 11/1987 | Kohls et al. |
| 4,712,694 | A | 12/1987 | Breslow |
| 4,718,626 | A | 1/1988 | Thalenfeld et al. |
| 4,742,923 | A | 5/1988 | Calvert |
| 4,821,894 | A | 4/1989 | Dechirot |
| D300,994 | S | 5/1989 | Wolff |
| 4,830,201 | A | 5/1989 | Breslow |
| 4,836,390 | A | 6/1989 | Polvere |
| 4,870,228 | A | 9/1989 | Speer et al. |
| 4,887,737 | A | 12/1989 | Adenau |
| 4,899,668 | A | 2/1990 | Valiulis |
| 4,901,869 | A | 2/1990 | Hawkinson et al. |
| 4,942,386 | A | 7/1990 | Willis |
| 4,944,414 | A | 7/1990 | Albright |
| 4,962,367 | A | 10/1990 | Tymn |
| 4,967,044 | A | 10/1990 | Speer et al. |
| 4,996,515 | A | 2/1991 | Schaffer et al. |
| 5,009,334 | A | 4/1991 | Bodkins |
| 5,068,643 | A | 11/1991 | Yashina |
| 5,070,986 | A | 12/1991 | Hoffman et al. |
| 5,083,638 | A | 1/1992 | Schneider |
| 5,086,641 | A | 2/1992 | Roselli |
| 5,114,021 | A | 5/1992 | Fredrickson |
| 5,161,704 | A | 11/1992 | Valiulis |
| 5,168,263 | A | 12/1992 | Drucker |
| 5,222,608 | A | 6/1993 | Eklof et al. |
| 5,240,126 | A | 8/1993 | Foster et al. |
| 5,255,182 | A | 10/1993 | Adams |
| 5,265,738 | A | 11/1993 | Yablans et al. |
| 5,307,941 | A | 5/1994 | Siegal |
| 5,317,304 | A | 5/1994 | Choi |
| 5,335,892 | A | 8/1994 | Busch |
| 5,397,856 | A | 3/1995 | Lee |
| 5,434,559 | A | 7/1995 | Smiley et al. |
| 5,469,135 | A | 11/1995 | Solow |
| 5,570,080 | A | 10/1996 | Inoue et al. |
| 5,610,337 | A | 3/1997 | Nelson |
| 5,641,077 | A | 6/1997 | Tufano et al. |
| 5,649,641 | A | 7/1997 | Campoli |
| 5,671,851 | A | 9/1997 | Johnson et al. |
| 5,685,664 | A | 11/1997 | Parham et al. |
| 5,690,238 | A | 11/1997 | Schmehr |
| 5,730,320 | A | 3/1998 | David |
| 5,748,082 | A | 5/1998 | Payne |
| 5,757,270 | A | 5/1998 | Mori |
| 5,815,066 | A | 9/1998 | Pumilia |
| 5,838,225 | A | 11/1998 | Todd |
| 5,839,588 | A | 11/1998 | Hawkinson |
| 5,855,282 | A | 1/1999 | Hardy |
| 5,905,438 | A | 5/1999 | Weiss et al. |
| 5,906,283 | A | 5/1999 | Kump et al. |
| 5,955,951 | A | 9/1999 | Wischerop et al. |
| 5,965,954 | A | 10/1999 | Johnson et al. |
| 5,971,173 | A | 10/1999 | Valiulis et al. |
| 5,977,654 | A | 11/1999 | Johnson et al. |
| 5,979,674 | A | 11/1999 | Thalenfeld |
| 5,995,003 | A | 11/1999 | Rogers |
| 6,041,720 | A | 3/2000 | Hardy |
| 6,049,268 | A | 4/2000 | Flick |
| 6,082,558 | A | 7/2000 | Battaglia |
| 6,102,192 | A | 8/2000 | Tomuro et al. |
| 6,105,791 | A | 8/2000 | Chalson et al. |
| 6,109,458 | A | 8/2000 | Walsh et al. |
| 6,129,218 | A | 10/2000 | Henry et al. |
| 6,131,748 | A | 10/2000 | Kawasaki et al. |
| 6,133,830 | A | 10/2000 | D'Angelo et al. |
| 6,158,598 | A | 12/2000 | Josefsson |
| 6,269,285 | B1 | 7/2001 | Mignault |
| 6,279,256 | B1 | 8/2001 | Norolof et al. |
| 6,286,690 | B1 | 9/2001 | Thalenfeld |
| 6,373,381 | B2 | 4/2002 | Wu |
| 6,409,028 | B2 | 6/2002 | Nickerson |
| 6,418,797 | B1 * | 7/2002 | Ambrosina .............. B62M 6/45 73/862.29 |
| 6,474,478 | B1 | 11/2002 | Huehner et al. |
| 6,517,000 | B1 | 2/2003 | McAllister et al. |
| D472,331 | S | 3/2003 | Zadak |
| 6,539,280 | B1 | 3/2003 | Valiulis et al. |
| 6,628,344 | B1 | 9/2003 | Weber |
| D480,231 | S | 10/2003 | Valiulis et al. |
| 6,659,291 | B2 | 12/2003 | Huehner et al. |
| 6,690,411 | B2 | 2/2004 | Naidoo et al. |
| 6,769,552 | B1 | 8/2004 | Thalenfeld |
| 6,820,754 | B2 | 11/2004 | Ondrasik |
| 6,824,009 | B2 | 11/2004 | Hardy |
| 6,874,684 | B1 | 4/2005 | Denenberg et al. |
| 6,886,699 | B2 | 5/2005 | Johnson et al. |
| 6,889,854 | B2 | 5/2005 | Burke |
| 6,923,330 | B1 | 8/2005 | Nagel |
| 6,964,235 | B2 | 11/2005 | Hardy |
| 6,967,578 | B1 | 11/2005 | Guida |
| 7,007,810 | B2 | 3/2006 | Huehner et al. |
| 7,017,778 | B2 | 3/2006 | Halbherr |
| 7,018,180 | B2 | 3/2006 | Koo |
| 7,059,518 | B2 | 6/2006 | Forster |
| 7,137,513 | B2 | 11/2006 | Sedon et al. |
| 7,174,176 | B1 | 2/2007 | Liu |
| 7,178,678 | B2 | 2/2007 | Mansfield et al. |
| 7,202,784 | B1 | 4/2007 | Herwig |
| 7,210,164 | B1 | 4/2007 | Jandrell |
| 7,258,461 | B1 | 8/2007 | Izardel |
| 7,287,669 | B2 | 10/2007 | Takeda |
| 7,293,663 | B2 | 11/2007 | Lavery, Jr. |
| 7,347,335 | B2 | 3/2008 | Rankin, VI et al. |
| 7,377,402 | B2 | 5/2008 | Takeda |
| 7,395,938 | B2 | 7/2008 | Merit et al. |
| 7,530,188 | B2 | 5/2009 | Beilenhoff et al. |
| 7,533,784 | B2 | 5/2009 | Vlastakis et al. |
| 7,559,437 | B2 | 7/2009 | Colelli et al. |
| 7,566,037 | B2 | 7/2009 | Vogler |
| 7,584,930 | B2 | 9/2009 | Zich |
| 7,591,422 | B2 | 9/2009 | Maitin |
| 7,591,442 | B2 | 9/2009 | Dinh et al. |
| 7,671,741 | B2 | 3/2010 | Lax et al. |
| 7,671,742 | B2 | 3/2010 | Fallin et al. |
| 7,749,121 | B2 | 7/2010 | Perng |

(56) References Cited

U.S. PATENT DOCUMENTS

| | | | |
|---|---|---|---|
| 7,768,399 B2 | 8/2010 | Hachmann et al. | |
| 7,792,711 B2 | 9/2010 | Swafford, Jr. et al. | |
| 7,828,158 B2 | 11/2010 | Colelli et al. | |
| 7,905,364 B2 | 3/2011 | Pail | |
| 7,916,020 B2 | 3/2011 | Seidel | |
| 7,969,305 B2 | 6/2011 | Belden, Jr. et al. | |
| 8,016,128 B2 | 9/2011 | Valiulis et al. | |
| 8,069,994 B2 | 12/2011 | Barkdoll | |
| 8,103,047 B1 | 1/2012 | Griess et al. | |
| 8,139,945 B1 | 3/2012 | Amir et al. | |
| 8,190,289 B2 | 5/2012 | Lockwood et al. | |
| 8,240,486 B2 | 8/2012 | Niederhuefner et al. | |
| 8,260,456 B2 | 9/2012 | Siegel et al. | |
| 8,274,391 B2 | 9/2012 | Yang | |
| 8,276,766 B2 | 10/2012 | Rataiczak, III et al. | |
| 8,328,027 B2 | 12/2012 | Barkdoll | |
| 8,360,253 B2 | 1/2013 | Hardy | |
| 8,368,542 B2 | 2/2013 | Yang | |
| 8,373,564 B2 | 2/2013 | Wyatt, Jr. et al. | |
| 8,378,826 B2 | 2/2013 | Mercier et al. | |
| 8,386,075 B2 | 2/2013 | Lockwood et al. | |
| 8,443,988 B2 | 5/2013 | Niederhuefner | |
| 8,534,469 B2 | 9/2013 | Northrup, Jr. et al. | |
| 8,629,772 B2 | 1/2014 | Valiulis et al. | |
| 8,720,702 B2 | 5/2014 | Nagel | |
| 8,803,687 B2 | 8/2014 | Valiulis et al. | |
| 8,812,378 B2 | 8/2014 | Swafford, Jr. et al. | |
| 8,823,521 B2 | 9/2014 | Overhultz et al. | |
| 8,884,761 B2 | 11/2014 | Valiulis | |
| 8,941,495 B2 | 1/2015 | Wiese et al. | |
| 9,009,773 B1 | 4/2015 | Hendricks et al. | |
| 9,129,494 B2 | 9/2015 | Valiulis et al. | |
| 9,167,916 B2 | 10/2015 | Grant et al. | |
| 9,241,583 B2 | 1/2016 | Nagel | |
| 9,254,049 B2 | 2/2016 | Nagel | |
| 9,318,007 B2 | 4/2016 | Valiulis et al. | |
| 9,318,008 B2 | 4/2016 | Valiulis et al. | |
| 9,324,220 B2 | 4/2016 | Valiulis | |
| 9,437,736 B2 | 9/2016 | Taniguchi et al. | |
| 9,483,896 B2 | 11/2016 | Lockwood et al. | |
| 9,495,856 B2 | 11/2016 | Brenner | |
| 9,576,417 B2 | 2/2017 | Christianson | |
| 9,805,334 B2 | 10/2017 | Overhultz et al. | |
| 9,805,539 B2 | 10/2017 | Swafford, Jr. et al. | |
| 9,818,081 B2 | 11/2017 | Khalid et al. | |
| 10,121,341 B2 | 11/2018 | Ewing et al. | |
| 10,271,666 B2 | 4/2019 | Taylor et al. | |
| 10,357,118 B2 | 7/2019 | Swafford | |
| 10,535,216 B2 | 1/2020 | Swafford, Jr. et al. | |
| 10,720,035 B2 | 7/2020 | Ewing et al. | |
| 10,885,753 B2 | 1/2021 | Ewing et al. | |
| 10,993,550 B2 | 5/2021 | Ewing et al. | |
| 11,154,143 B2 | 10/2021 | Ewing et al. | |
| 11,317,738 B2 | 5/2022 | Ewing et al. | |
| 11,363,894 B2 | 6/2022 | Ewing et al. | |
| 11,412,863 B2 | 8/2022 | Grant et al. | |
| 11,605,276 B2 | 3/2023 | Ewing et al. | |
| 2001/0002210 A1 | 5/2001 | Petite | |
| 2001/0004239 A1 | 6/2001 | Irizarry et al. | |
| 2001/0044751 A1 | 11/2001 | Pugliese, III et al. | |
| 2002/0004690 A1 | 1/2002 | Paulucci et al. | |
| 2002/0067259 A1 | 6/2002 | Fufidio et al. | |
| 2002/0108916 A1 | 8/2002 | Nickerson | |
| 2002/0130776 A1 | 9/2002 | Houde | |
| 2002/0188866 A1 | 12/2002 | Jalaludeen et al. | |
| 2003/0004784 A1 | 1/2003 | Li et al. | |
| 2003/0029816 A1 | 2/2003 | Huehner et al. | |
| 2003/0030548 A1 | 2/2003 | Kovacs et al. | |
| 2003/0057167 A1 | 3/2003 | Johnson et al. | |
| 2003/0175004 A1 | 9/2003 | Garito et al. | |
| 2003/0227382 A1 | 12/2003 | Breed | |
| 2004/0034581 A1 | 2/2004 | Hill et al. | |
| 2004/0053044 A1 | 3/2004 | Moreno et al. | |
| 2004/0073334 A1 | 4/2004 | Terranova | |
| 2004/0084386 A1 | 5/2004 | Huehner et al. | |
| 2004/0124201 A1 | 7/2004 | Hieb | |
| 2004/0145477 A1 | 7/2004 | Easter et al. | |
| 2004/0195319 A1 | 10/2004 | Forster | |
| 2005/0029283 A1 | 2/2005 | Pedigo | |
| 2005/0040123 A1 | 2/2005 | Ali | |
| 2005/0056602 A1 | 3/2005 | Hardy | |
| 2005/0098626 A1 | 5/2005 | Jordan et al. | |
| 2005/0104733 A1 | 5/2005 | Campero | |
| 2005/0161420 A1 | 7/2005 | Hardy et al. | |
| 2005/0168345 A1 | 8/2005 | Swafford, Jr. et al. | |
| 2005/0189309 A1 | 9/2005 | Hardy | |
| 2005/0189369 A1 | 9/2005 | Vlastakis et al. | |
| 2005/0261816 A1 | 11/2005 | DiCroce et al. | |
| 2005/0279722 A1 | 12/2005 | Ali | |
| 2005/0288708 A1 | 12/2005 | Kammerer et al. | |
| 2006/0049122 A1 | 3/2006 | Mueller et al. | |
| 2006/0068144 A1 | 3/2006 | Mizuno et al. | |
| 2006/0163180 A1 | 7/2006 | Rankin, VI et al. | |
| 2006/0163272 A1 | 7/2006 | Gamble | |
| 2006/0198611 A1 | 9/2006 | Park | |
| 2006/0219517 A1 | 10/2006 | Cheng et al. | |
| 2006/0226095 A1 | 10/2006 | Hardy | |
| 2006/0240398 A1 | 10/2006 | Hardy et al. | |
| 2007/0050271 A1 | 3/2007 | Ufford et al. | |
| 2007/0080123 A1 | 4/2007 | Mason | |
| 2007/0080806 A1 | 4/2007 | Lax et al. | |
| 2007/0095903 A1 | 5/2007 | Suenbuel | |
| 2007/0108142 A1 | 5/2007 | Medcalf et al. | |
| 2007/0115100 A1 | 5/2007 | Mandie | |
| 2007/0171059 A1 | 7/2007 | Pistilli | |
| 2007/0251900 A1 | 11/2007 | Hardy | |
| 2007/0265866 A1 | 11/2007 | Fehling | |
| 2007/0267364 A1 | 11/2007 | Barkdoll | |
| 2007/0267367 A1 | 11/2007 | Mueller et al. | |
| 2007/0273513 A1 | 11/2007 | White | |
| 2008/0015956 A1 | 1/2008 | Regard | |
| 2008/0203253 A1 | 8/2008 | Vogler | |
| 2008/0307687 A1 | 12/2008 | Nagel et al. | |
| 2008/0309489 A1 | 12/2008 | Hachmann et al. | |
| 2009/0006196 A1 | 1/2009 | Barkan et al. | |
| 2009/0079557 A1 | 3/2009 | Miner | |
| 2009/0091448 A1 | 4/2009 | Leyden et al. | |
| 2009/0095695 A1 | 4/2009 | Moock et al. | |
| 2009/0101606 A1 | 4/2009 | Olson | |
| 2009/0109027 A1 | 4/2009 | Schuller | |
| 2009/0174566 A1 | 7/2009 | Volk et al. | |
| 2009/0248198 A1 | 10/2009 | Siegel et al. | |
| 2009/0308494 A1 | 12/2009 | Linn | |
| 2010/0012602 A1 | 1/2010 | Valiulis et al. | |
| 2010/0013603 A1 | 1/2010 | Chatani et al. | |
| 2010/0097223 A1 | 4/2010 | Kruest et al. | |
| 2010/0175438 A1 | 7/2010 | Sankey | |
| 2010/0200526 A1 | 8/2010 | Barkdoll | |
| 2010/0237093 A1 | 9/2010 | Lockwood et al. | |
| 2010/0238031 A1 | 9/2010 | Belden, Jr. et al. | |
| 2010/0268792 A1 | 10/2010 | Butler et al. | |
| 2011/0055103 A1 | 3/2011 | Swafford, Jr. et al. | |
| 2011/0062794 A1 | 3/2011 | Vergoossen et al. | |
| 2011/0068921 A1 | 3/2011 | Shafer | |
| 2011/0094975 A1 | 4/2011 | Hardy | |
| 2011/0127225 A1* | 6/2011 | Hooks, Jr. | A47F 5/0823 211/1.57 |
| 2011/0168652 A1 | 7/2011 | Barkdoll | |
| 2011/0215060 A1 | 9/2011 | Niederhuefner | |
| 2011/0218889 A1 | 9/2011 | Westberg et al. | |
| 2011/0227735 A1 | 9/2011 | Fawcett et al. | |
| 2011/0282768 A1 | 11/2011 | Swafford, Jr. et al. | |
| 2011/0284571 A1 | 11/2011 | Lockwood et al. | |
| 2011/0310307 A1 | 12/2011 | Takahashi | |
| 2012/0006764 A1 | 1/2012 | Hachmann et al. | |
| 2012/0091162 A1 | 4/2012 | Overhultz et al. | |
| 2012/0120571 A1 | 5/2012 | Bisesti et al. | |
| 2012/0209426 A1 | 8/2012 | Lockwood et al. | |
| 2012/0253508 A1* | 10/2012 | Holmes | A47F 1/128 700/232 |
| 2012/0287090 A1 | 11/2012 | Cacioppo | |
| 2012/0293330 A1 | 11/2012 | Grant et al. | |
| 2013/0002422 A1 | 1/2013 | Wiese et al. | |
| 2013/0024023 A1 | 1/2013 | Siegel et al. | |

(56) References Cited

U.S. PATENT DOCUMENTS

| | | | |
|---|---|---|---|
| 2013/0057524 A1 | 3/2013 | Bertin et al. | |
| 2013/0106259 A1 | 5/2013 | Lockwood et al. | |
| 2013/0141240 A1 | 6/2013 | Valiulis et al. | |
| 2013/0142494 A1 | 6/2013 | Valiulis et al. | |
| 2013/0144433 A1 | 6/2013 | Lockwood et al. | |
| 2013/0247834 A1 | 9/2013 | Kodat | |
| 2013/0312644 A1 | 11/2013 | Copeland | |
| 2014/0055264 A1 | 2/2014 | Valiulis et al. | |
| 2014/0055266 A1 | 2/2014 | Valiulis | |
| 2014/0070948 A1 | 3/2014 | Valiulis et al. | |
| 2014/0197953 A1 | 7/2014 | Valiulis et al. | |
| 2014/0352372 A1 | 12/2014 | Grant et al. | |
| 2015/0042178 A1 | 2/2015 | Kim | |
| 2015/0068991 A1 | 3/2015 | Kostka | |
| 2015/0096998 A1* | 4/2015 | Bird | A47F 1/128 221/13 |
| 2015/0238026 A1 | 8/2015 | Chambers | |
| 2015/0321827 A1 | 11/2015 | Lockwood et al. | |
| 2015/0371482 A1 | 12/2015 | Szpak et al. | |
| 2016/0005282 A1 | 1/2016 | Lax et al. | |
| 2016/0132822 A1 | 5/2016 | Swafford | |
| 2017/0202369 A1 | 7/2017 | Mercier et al. | |
| 2017/0303704 A1 | 10/2017 | Taylor et al. | |
| 2018/0047243 A1 | 2/2018 | Swafford, Jr. et al. | |
| 2018/0107973 A1 | 4/2018 | Overhultz et al. | |
| 2018/0365953 A1 | 12/2018 | Ewing et al. | |
| 2019/0019140 A1 | 1/2019 | Costello et al. | |
| 2019/0183259 A1 | 6/2019 | Grant et al. | |
| 2019/0275498 A1 | 9/2019 | Tanba et al. | |
| 2019/0290020 A1 | 9/2019 | Ewing et al. | |
| 2019/0374048 A1 | 12/2019 | Valiulis et al. | |
| 2021/0001785 A1* | 1/2021 | Rose | B60W 40/08 |
| 2022/0000278 A1 | 1/2022 | Ewing et al. | |
| 2022/0202207 A1 | 6/2022 | Ewing et al. | |
| 2022/0240693 A1 | 8/2022 | Ewing et al. | |
| 2023/0059326 A1 | 2/2023 | Ewing et al. | |

FOREIGN PATENT DOCUMENTS

| | | | |
|---|---|---|---|
| CN | 102763184 | A | 10/2012 |
| CN | 103158757 | A | 6/2013 |
| CN | 103198387 | A | 7/2013 |
| CN | 204039597 | U | 12/2014 |
| CN | 104631970 | A | 5/2015 |
| CN | 204351457 | U | 5/2015 |
| CN | 104981825 | A | 10/2015 |
| CN | 107462171 | A | 12/2017 |
| CN | 107529899 | A | 1/2018 |
| CN | 108694540 | A | 10/2018 |
| CN | 207943567 | U | 10/2018 |
| DE | 202005010088 | U1 | 9/2005 |
| DE | 102011012163 | A1 | 8/2012 |
| EP | 0868871 | A1 | 10/1998 |
| EP | 1256296 | A2 | 11/2002 |
| EP | 1541064 | A1 | 6/2005 |
| EP | 1541064 | B1 | 2/2006 |
| EP | 2888723 | A1 | 7/2015 |
| EP | 2988281 | A1 | 2/2016 |
| GB | 2304102 | A | 3/1997 |
| GB | 2360514 | A | 9/2001 |
| KR | 100823026 | B1 | 4/2008 |
| KR | 20100137956 | A | 12/2010 |
| KR | 20110002261 | U | 3/2011 |
| KR | 20110043837 | A | 4/2011 |
| KR | 20110080411 | A | 7/2011 |
| NL | 1001794 | C2 | 6/1997 |
| WO | WO 9103967 | A1 | 4/1991 |
| WO | WO 9740724 | A1 | 11/1997 |
| WO | WO 9927824 | A1 | 6/1999 |
| WO | WO 0181988 | A2 | 11/2001 |
| WO | WO 2004/083051 | A2 | 9/2004 |
| WO | WO 2005/107535 | A1 | 11/2005 |
| WO | WO 2009/100857 | A1 | 8/2009 |
| WO | WO 2011/025085 | A1 | 3/2011 |
| WO | WO 2012/113536 | A1 | 8/2012 |
| WO | WO 2012/127849 | A1 | 9/2012 |
| WO | WO 2018/045038 | A1 | 3/2018 |

OTHER PUBLICATIONS

U.S. Appl. No. 18/106,233, filed Feb. 6, 2023, Ewing et al.

U.S. Appl. No. 18/114,006, filed Feb. 24, 2023, Ewing et al.

POS Tuning—für mehr Erfolg am Point of Sale: POS T-Product Pusher; http://www.postuning.de/69.0.html?&L=2; website; Mar. 29, 2006; 1 page.

POS Tuning—für mehr Erfolg am Point of Sale: The POS T-Systemtray; http://www.postuning.de/68.0.hyml?L=2; website; Mar. 29, 2006; 1 page.

Indyme smartresponse; 2 pages printed from internet http://www.indyme.com/; date last visited Apr. 8, 2013.

* cited by examiner

ANTI-SWEEPING HOOK WITH INTEGRATED LOSS PREVENTION FUNCTIONALITY

CROSS-REFERENCE TO RELATED PATENT APPLICATION

This patent application is a continuation of U.S. patent application Ser. No. 17/480,788 filed Sep. 21, 2021, which is a continuation of U.S. patent application Ser. No. 16/588,573, filed Sep. 30, 2019, and which issued as U.S. Pat. No. 11,154,143 on Oct. 26, 2021, the entire teachings and disclosures of which are incorporated herein by reference thereto.

BACKGROUND OF THE INVENTION

In certain retail environments that use conventional wire hook displays, one disadvantage is that a large number of items can often be easily swept or removed from the wire hook display at any one time, through a simple sliding action. As a result, thieves have been able to enter a commercial environment and simply remove all items from a conventional wire hook in a simple sliding motion and abscond without drawing attention to their actions.

Consequently, there is a need to provide a device that provides many of the advantages of the conventional wire hook display device while also providing a deterrent against theft of items stored on the display device.

Embodiments of the present invention provides such a device. These and other advantages of the invention, as well as additional inventive features, will be apparent from the description of the invention provided herein.

BRIEF SUMMARY OF THE INVENTION

In one aspect, embodiments of the invention provide an anti-sweeping hook that includes a display hook for storing retail merchandise. In some embodiments, the display hook is substantially straight and has a first end and a second end opposite the first end. A helical coil is disposed about the display hook and extending along a lengthwise portion of the display hook. The helical coil has a first coil end proximate the first end of the display hook. Rotation of the helical coil in a first direction loads the retail merchandise onto the display hook. Rotation of the helical coil in a second direction opposite the first direction removes the retail merchandise from the display hook. A rotating handle is attached to the first end of the display hook and to the first coil end. The rotating handle is configured to determine an extent of rotation for the rotating handle.

In a particular embodiment, the rotating handle includes a first contact and a second contact disposed within a main housing of the rotating handle such that an electrical connection between the first and second contacts indicates some rotation of the rotating handle. In a more particular embodiment, the rotating handle includes a rotor and stator each disposed within the main housing of the rotating handle. In a more particular embodiment, the first contact is attached to the main housing, and the second contact is attached to the rotor. The rotor and stator are configured such that rotation of the rotor in a first direction prevents any electrical connection between the first and second contacts, and rotation of the rotor in a second direction opposite the first direction facilitates electrical connections between the first and second contacts.

In certain embodiments, the stator is configured to prevent rotation of the stator and of the second contact in the first direction, and configured to allow rotation of the stator and of the second contact in the second direction. The rotating handle may include a circuit board with circuitry configured to count the electrical connections between the first and second contacts. In some embodiments, the circuitry includes an MCU configured to trigger an alarm if a threshold number of electrical connections between the first and second contacts occurs within a predetermined time period.

The alarm may be one of an audio alarm, a visual alarm, and a wired or wireless signal transmitted to a local or remotely-located receiving device. In particular embodiments, the MCU enters a sleep mode if there is no electrical connection between the first and second contacts for the predetermined time period. In other embodiments, the MCU provides one of an audio indicator, a visual indicator, and a wired or wireless indicator signal transmitted to a local or remotely-located receiving device prior to entering sleep mode.

In another aspect, embodiments of the invention provide a rotating handle for an anti-sweeping retail display hook. The rotating handle includes a first contact and a second contact disposed within a main housing of the rotating handle such that an electrical connection between the first and second contacts indicates some rotation of the rotating handle. A rotor and stator are each disposed within the main housing of the rotating handle. The rotor and stator are configured such that rotation of the rotor in a first direction prevents any electrical connection between the first and second contacts, and rotation of the rotor in a second direction opposite the first direction facilitates electrical connections between the first and second contacts.

In some embodiments, the stator is configured to prevent rotation of the stator and of the second contact in the first direction, and configured to allow rotation of the stator and of the second contact in the second direction. In other embodiments, the rotating handle includes a circuit board with circuitry configured to count the electrical connections between the first and second contacts. The circuitry may include an MCU configured to trigger an alarm if a threshold number of electrical connections between the first and second contacts occurs within a predetermined time period. The alarm may be one of an audio alarm, a visual alarm, and a wired or wireless signal transmitted to a local or remotely-located receiving device.

In particular embodiments, the MCU enters a sleep mode if there is no electrical connection between the first and second contacts for the predetermined time period. In a further embodiment, the MCU provides an audio indicator, a visual indicator, and a wired or wireless indicator signal transmitted to a local or remotely-located receiving device prior to entering sleep mode.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
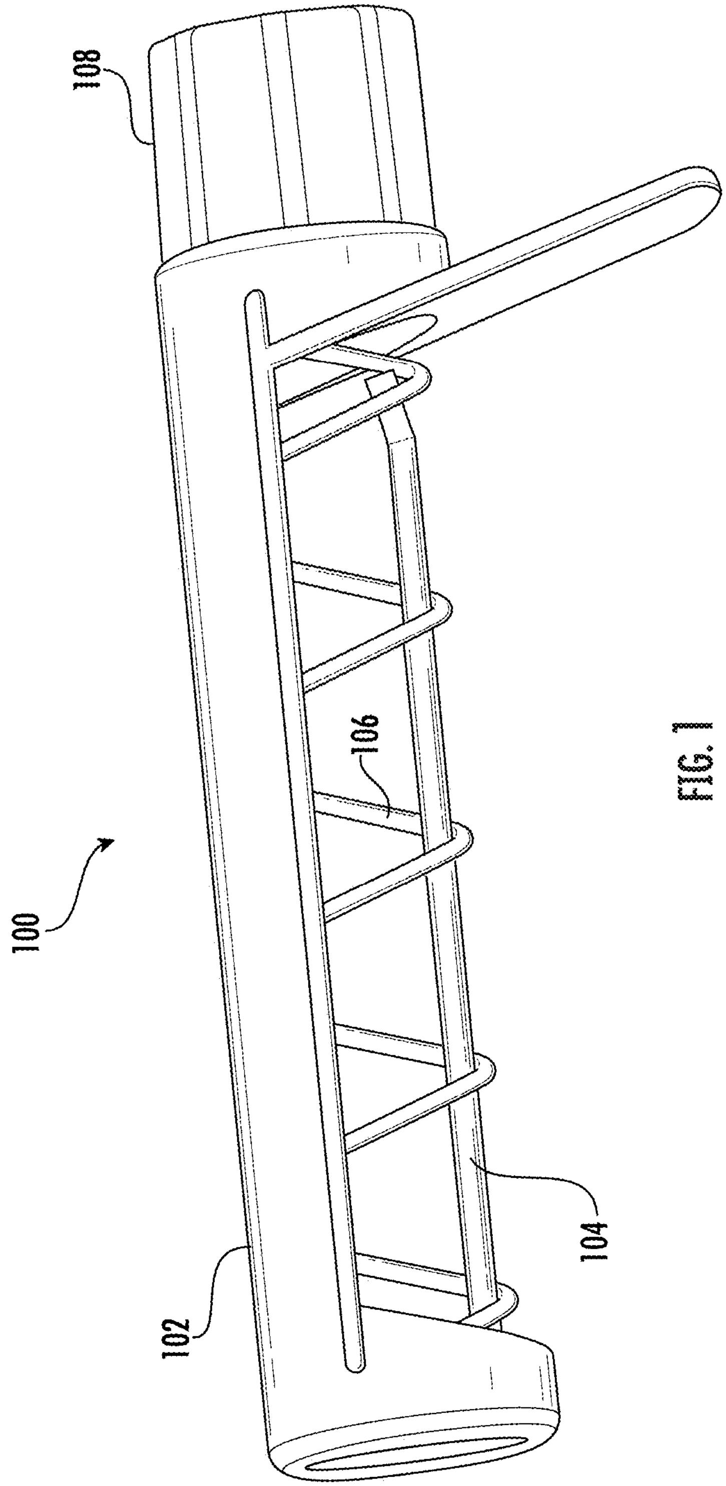
FIG. 1 is a perspective view of an anti-sweeping hook with integrated loss prevention functionality, constructed in accordance with an embodiment of the invention.

FIG. 1 is a perspective view of an anti-sweeping hook 100 with integrated loss prevention functionality, constructed in accordance with an embodiment of the invention. The anti-sweeping hook 100 includes a housing 102 in which is disposed a display hook 104 and a helical coil 106 which is used in the loading and unloading of merchandise stored on the display hook 104. In the embodiment of FIG. 1, the display hook 104 is substantially straight. The display hook 104 may be bend or curved at one end. The coil 106 is coupled to a rotating handle 108 which rotates the coil 106 as it is turned. For example, the rotating handle 108 may be rotated in a clockwise direction when loading merchandise onto the display hook 104. The coil 106 would operate to move the merchandise onto the display hook 104 away from the user or customer. Accordingly, rotating the rotating handle 108 in a counterclockwise direction would operate to remove the merchandise from the display hook 104. It should be recognized that, in other embodiments, the direction of rotation for the rotating handle 108 could be clockwise for removing merchandise and counterclockwise for loading merchandise.

Figure 2:
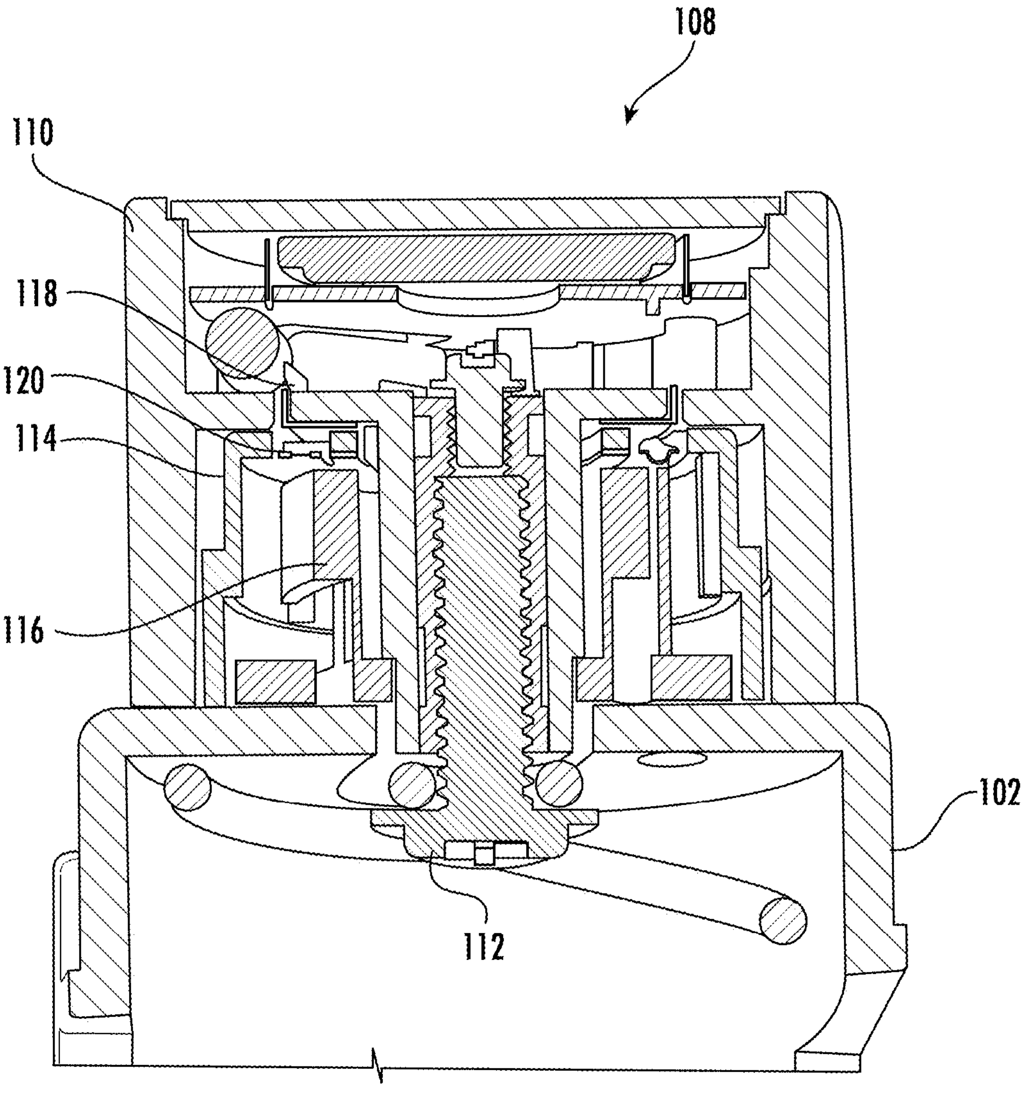
FIG. 2 is a cross-sectional view of a rotating handle for the anti-sweeping hook, constructed in accordance with an embodiment of the invention.

To prevent sweeping, or theft, of all of the products on the display hook 104, the rotating handle 108 includes components designed to monitor the removal of merchandise from the display hook 104. FIG. 2 shows a cross-sectional view of the rotating handle 108, constructed in accordance with an embodiment of the invention. In the embodiment of FIG. 2, the rotating handle 108 has a main rotating handle housing 110 and a central fastener 112 which connects the rotating handle 108 to the coil 106 disposed within housing 102.

Figure 3:
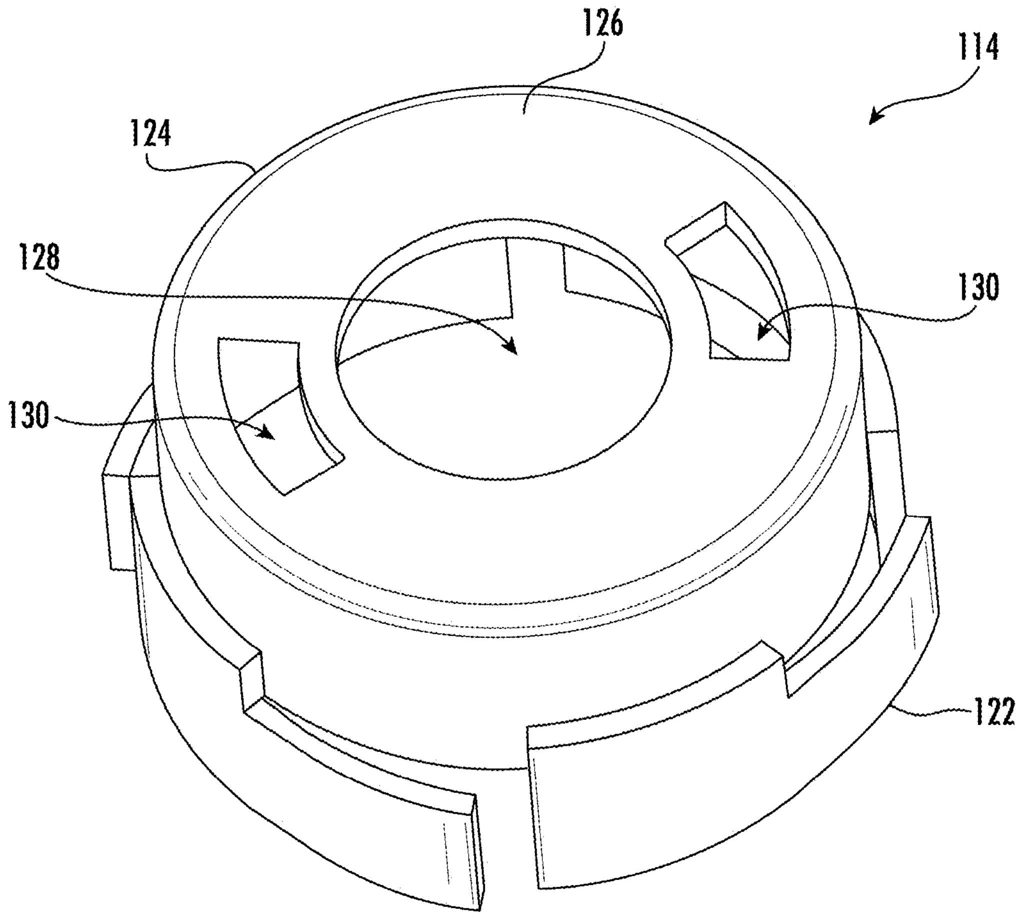
FIG. 3 is a perspective view of a rotor used in the rotating handle for the anti-sweeping hook, constructed in accordance with an embodiment of the invention.
Figure 4:
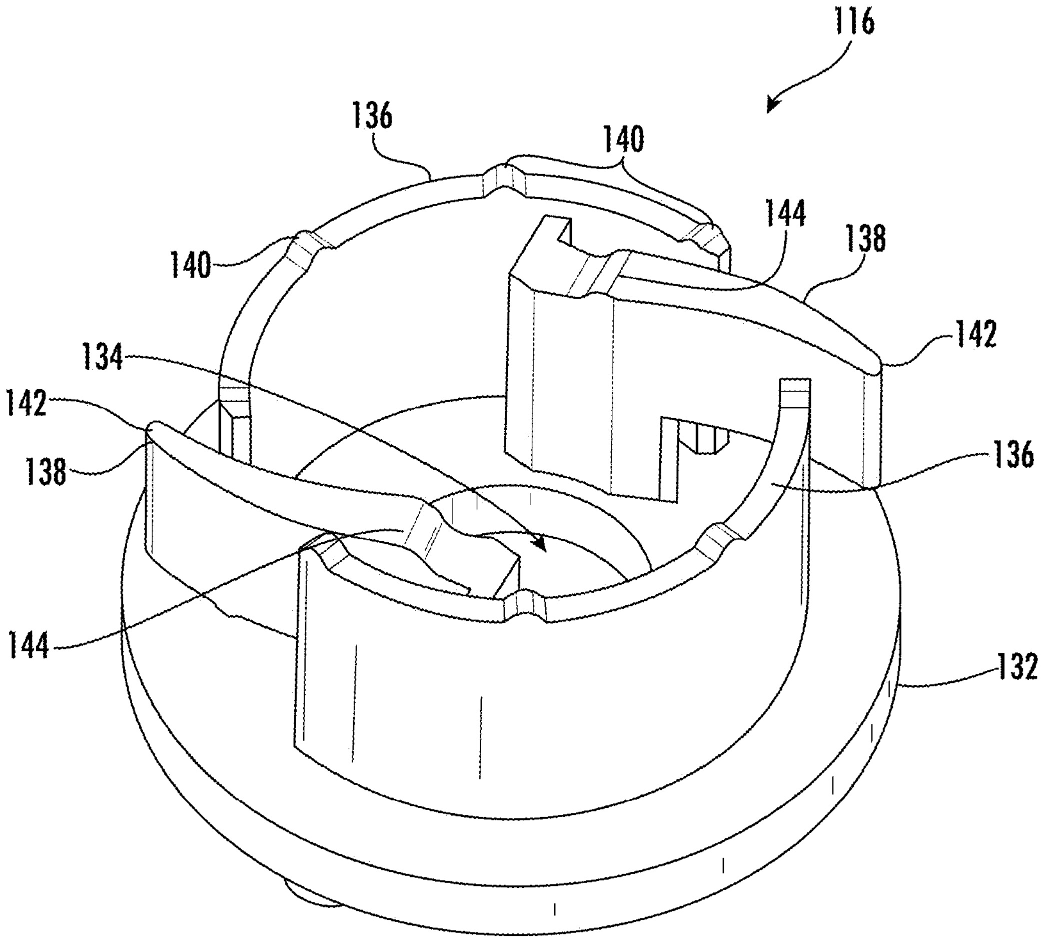
FIG. 4 is a perspective view of a stator used in the rotating handle for the anti-sweeping hook, constructed in accordance with an embodiment of the invention.

The main rotating handle housing 110 houses a rotor 114, which is shown in more detail in the perspective view of FIG. 3, and a stator 116, which is shown in more detail in FIG. 4. The main rotating handle housing 110 also houses a first contact 118, also shown and described below in relation to FIG. 5. A second contact 120 is disposed within the main rotating handle housing 110 and shown in more detail in FIG. 6.

As shown in the embodiment of FIG. 2, the first contact 118 is secured to the main rotating handle housing 110, while the second contact 120 is secured to the rotor 114. In FIG. 2, the stator 116 is position below and within the rotor 114.

The embodiment of the rotor 114, shown in the perspective view of FIG. 3, includes a lower perimeter wall 122 which includes notches and openings to facilitate attachment to an interior wall of the main rotating handle housing 110. An upper portion 124 of the rotor 114 includes a top surface 126 with a central opening 128 and two arcuate openings 130 located on opposite sides of the central opening 128. The central opening 128 accommodates the aforementioned central fastener 112 which, in the embodiment of FIG. 2, is positioned along a central portion of the main rotating handle housing 110. As will be explained below, the two arcuate openings 130 allow for electrical contact between the first contact 118 and the second contact 120.

That electrical contact is facilitated by the interaction between the rotor 114 and the stator 116. FIG. 4 is a perspective view of the stator 116 according to an embodiment of the invention. The embodiment of the stator 116 shown in FIG. 4 includes a base 132 with a base central opening 134. On opposite sides of the base central opening 134, there are two curved walls 136. There are two gaps on opposite sides of the base central opening 134 between the two curved walls 136, and, in those gaps, there are two sloped barriers 138. Each of the two curved walls 136 has a plurality of raised portions 140. In the embodiment shown, each of the two curved walls 136 has four raised portions 140, though it is envisioned that alternate embodiments of the stator 116 may have curved walls 136 with a greater or lesser number of raised portions. The sloped barriers 138 have a low end 142 and a high end 144 which slopes upward from the low end 142.

Figure 5:
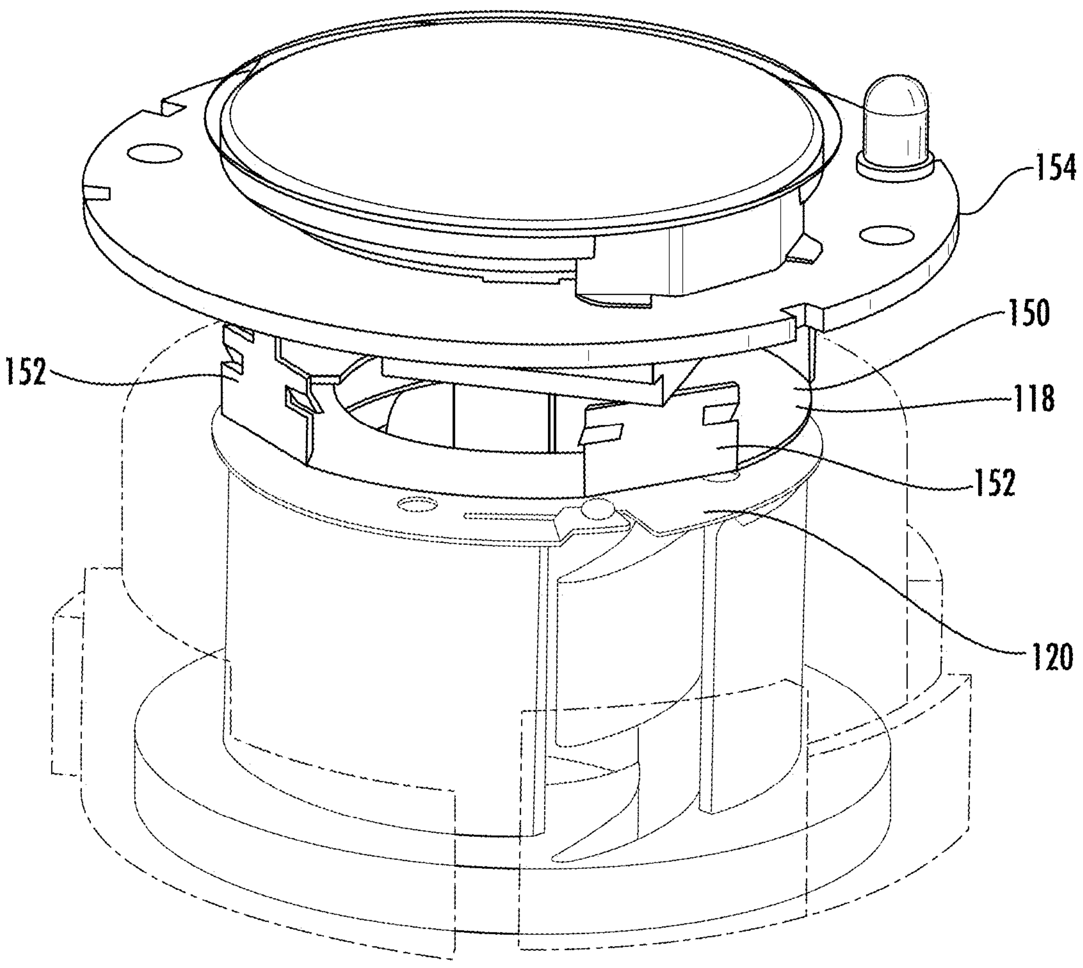
FIG. 5 is a perspective view a portion of the rotating handle, according to an embodiment of the invention.

FIG. 5 is a perspective view a portion of the rotating handle 108, according to an embodiment of the invention, which shows the first and second contacts 118, 120. In the embodiment shown, the first contact 118 has a flat ring-shaped portion and a plurality of tabs 152 to provide electrical connection with a circuit board 154.

Figure 6:
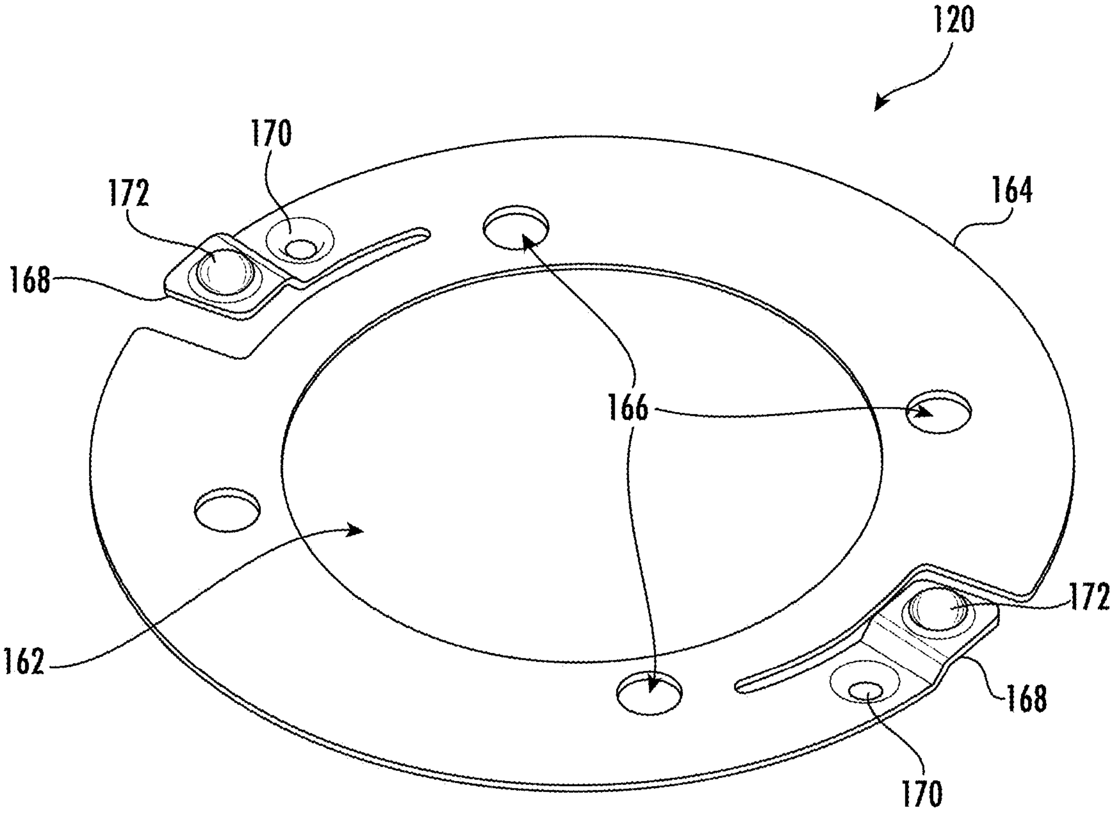
FIG. 6 is a perspective view of the second contact in accordance with an embodiment of the invention.

FIG. 6 is a perspective view of the second contact 120 in accordance with an embodiment of the invention. In the embodiment of FIG. 6, the second contact 120 has a main opening 162 surrounded by a ring-like body 164 which has a plurality of small openings 166 to facilitate attachment of the second contact 120 to the rotor 114. The ring-like body 164 includes two contact fingers 168 located on opposite sides of the main opening 162. Each contact finger 168 has a downward-facing bump 170 and an upward-facing bump 172. The two contact fingers 168 are configured to move relative to the ring-like body 164.

Referring to FIGS. 2-6, the anti-sweeping hook 100 can be described in operation. As shown in FIG. 2, the first contact 118 is attached to an interior surface of the main rotating handle housing 110 in close proximity to the rotor 114 which, as described above, is attached to a different interior surface of the main rotating handle housing 110. The stator 116 is positioned within the rotor 114 such that the two curved walls 136 and the plurality of raised portions 140 thereon are aligned with the two arcuate openings 130 of the rotor 114.

The sloped barriers 138 on the stator 116 are designed such that they prevent rotation of the rotor 114 in one direction. More particularly, when the rotating handle 108, and more particularly the main rotating handle housing 110, is rotated in a first direction, the high ends 144 of the two sloped barriers 138 come into contact with the rotor 114 at the two arcuate openings 130 to prevent the rotor 114 from rotating with the main rotating handle housing 110. Rotation of the main rotating handle housing 110 in this first direction is for loading merchandise onto the display hook 104.

When the rotating handle 108 and the main rotating handle housing 110 are rotated in a second direction opposite the first direction, the two arcuate openings 130 first contact the low end 142 of the two sloped barriers 138 such that the rotor 114 is not prevented from rotating with the main rotating handle housing 110. As the main rotating handle housing 110 is rotating in this second direction, the rotor 114 and attached second contact 120 are rotating as well. This causes the two fingers 168 on the second contact 120 to rise and fall as the downward-facing bumps 170 come into contact with the plurality of raised portions 140 on the two curved walls 136 of the stator 116. When the two fingers 168 rise due to this contact with the raised portions 140, the two upward-facing bumps 172 of the second contact 120 come into contact with the first contact 118 which, in certain embodiments, is attached to the main rotating handle housing 110. The resulting electrical connection between the first and second contacts 118, 120 is detected by circuitry on the circuit board 154. Rotation of the main rotating handle housing 110 in this second direction is for removing merchandise from the display hook 104. Thus, with the stator 116, as shown, having four raised portions 140 on each curved wall 136, there would be eight electrical connections between the first and second contacts 118, 120 for each rotation of the rotating handle 108 in the second direction.

Figure 7:
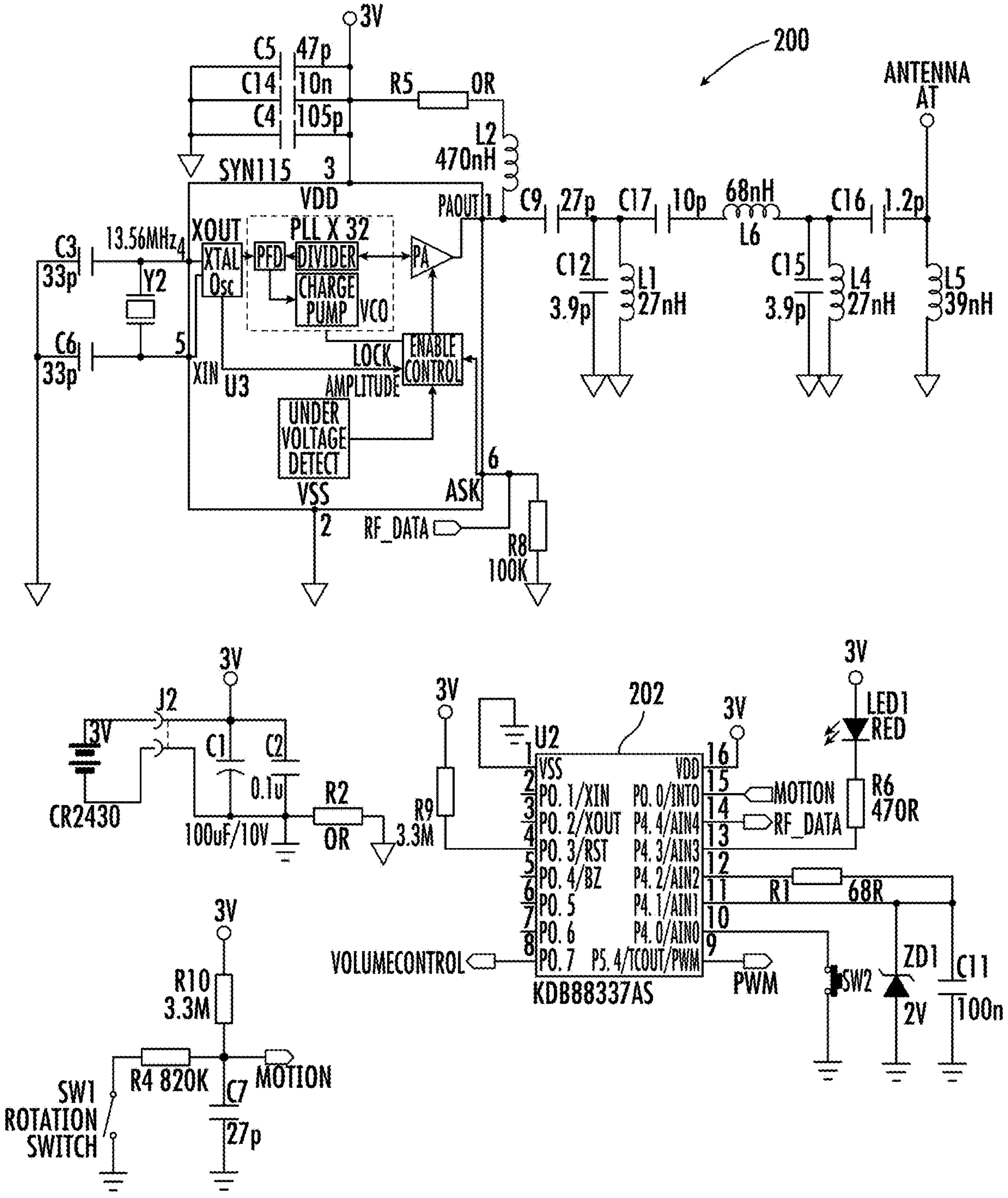
FIG. 7 is a schematic diagram for an exemplary circuit which is included on a circuit board shown in FIG. 5, in accordance with an embodiment of the invention.

FIG. 7 shows a schematic diagram for an exemplary circuit 200 which is included on the circuit board 154 shown in FIG. 5. In one example, when power is supplied to the product, port P5.4 emits an audio signal, such as a beep. A visual signal, such as an LED may flash synchronously at port P4.3, then a microcontroller unit (MCU) 202 enters sleep mode in which the MCU 202 conserves energy.

When the rotating handle 108 is rotated, the MCU 202 wakes up from sleep mode. In such an instance, MCU port P0.0 detects the trigger signal (rotation handle rotates), and counts pulses, or the electrical connections between first and second contacts 118, 120 generated by each rotation of the rotating handle 108. The MCU 202 outputs an audio, visual, or radio signal according to the following conditions. For example, if the number of accumulated electrical connections or pulses in a predetermined time period (e.g., 10 seconds) exceeds a threshold value (e.g., 24, which for the embodiments shown indicates three full rotations of the rotating handle 108, the MCU 202 outputs an audio, visual, wired, or wireless alarm signal. The alarm signal, which indicates that three or more items have been removed from the display hook 104 in a short period of time, which may indicate a theft in progress. In another example, the number of pulses generated by each rotation operation, during the predetermined time period, is greater than one but less than 24, MCU 202 outputs an audio, visual or radio signal indicative of a non-theft condition or that the MCU 202 is entering sleep mode. If there are no pulses for a predetermined period of time (e.g., 0.6 seconds at Port P0.0), the MCU 202 determines that the current rotating operation of the rotating handle 108 has been completed.

In a particular embodiment, the visual indicator is an LED, where the LED flashes synchronously with the audio signal when an alarm is triggered, or flashes synchronously with no audio alarm. The MCU 202 may also cause the LED flash to flash in a specific pattern, possibly in concert with an audio signal, to signal a low voltage warning.

Figure 8:
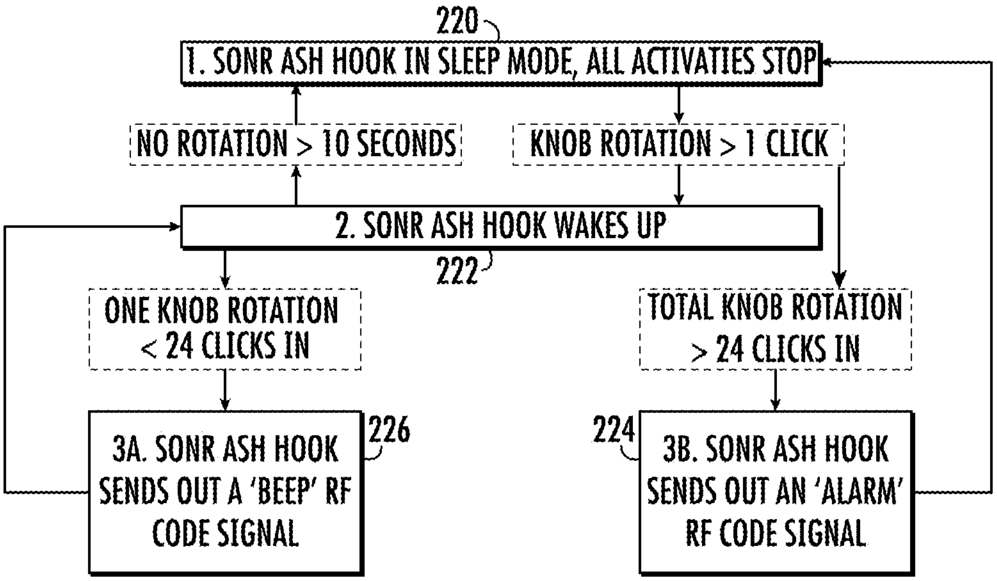
FIG. 8 is a block diagram showing how the circuit of FIG. 7 functions in an exemplary operation of the anti-sweeping hook.

FIG. 8 is a block diagram showing how the circuit 200 of FIG. 7 functions in an exemplary operation of the anti-sweeping hook 100. In the example of FIG. 8, the MCU 202 in circuit 200 starts off in sleep mode in which there is no activity 220. Rotation of the rotating handle 108, such there is at least one electrical connection between the first and second contacts 118, 120, causes the MCU 202 to wake up 222. If the number of electrical connection between the first and second contacts 118, 120 is below some threshold value for a predetermined period of time, the MCU 202 goes back into sleep mode.

In the diagram of FIG. 8, the threshold number of electrical connection between the first and second contacts 118, 120 is 24, and the predetermined period of time is 10 seconds. However, these values may be increased and/or decreased in alternate embodiments of the invention. If the number of electrical connection between the first and second contacts 118, 120 exceeds the threshold value within the predetermined period of time, the MCU 202 triggers an alarm 224. The alarm may take a variety of forms, including but not limited to an audio alarm, a visual alarm via an LED or other lighting means, a wired or wireless signal, such as an RF signal sent to a local or remotely-located receiving device. If the number of electrical connection between the first and second contacts 118, 120 is less than the threshold value, before going into sleep mode the MCU 202 may send an audio signal, such as a beep, or flash the LED, or send a wired or wireless signal to indicate that the MCU 202 is going into sleep mode 226.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A rotating handle for an anti-sweeping retail display hook, the rotating handle comprising:

a first contact and a second contact disposed within a main housing of the rotating handle such that an electrical connection between the first and second contacts indicates some rotation of the rotating handle; and a rotor and stator each disposed within the main housing of the rotating handle, the rotor and stator configured such that rotation of the rotating handle in a first direction prevents any electrical connection between the first and second contacts.

2. The rotating handle of claim 1, wherein the stator is configured to prevent rotation of the rotor and of the second contact in the first direction, and configured to allow rotation of the rotor and of the second contact in a second direction.

3. The anti-sweeping hook of claim 2, wherein the rotating handle includes a circuit board with circuitry configured to count the electrical connections between the first and second contacts.

4. The anti-sweeping hook of claim 3, wherein the circuitry includes an MCU configured to trigger an alarm if a threshold number of electrical connections between the first and second contacts occurs within a predetermined time period.

5. The anti-sweeping hook of claim 4, wherein the alarm is one of an audio alarm, a visual alarm, and a wired or wireless signal transmitted to a local or remotely-located receiving device.

6. The anti-sweeping hook of claim 4, wherein the MCU enters a sleep mode if there is no electrical connection between the first and second contacts for the predetermined time period.

7. The anti-sweeping hook of claim 6, wherein the MCU provides an audio indicator, a visual indicator, and a wired or wireless indicator signal transmitted to a local or remotely-located receiving device prior to entering the sleep mode.

* * * * *